US010266723B2

(12) United States Patent
Berry et al.

(10) Patent No.: US 10,266,723 B2
(45) Date of Patent: Apr. 23, 2019

(54) ICE ADHESION REDUCING POLYMERS

(71) Applicants: The Boeing Company, Chicago, IL (US); Commonwealth Scientific and Industrial Research Organisation, Acton (AU)

(72) Inventors: Douglas Henry Berry, Seattle, WA (US); Jill Elisabeth Seebergh, Seattle, WA (US); Stuart Arthur Bateman, Melbourne (AU); Ranya Simons, Melbourne (AU); Sheng Li, Melbourne (AU); Lee Russell, Melbourne (AU)

(73) Assignees: The Boeing Company, Chicago, IL (US); Commonwealth Scientific and Industrial Research Organisation, Acton (AU)

( * ) Notice: Subject to any disclaimer, the term of this patent is extended or adjusted under 35 U.S.C. 154(b) by 69 days.

(21) Appl. No.: 15/313,786

(22) PCT Filed: May 29, 2015

(86) PCT No.: PCT/AU2015/000324
§ 371 (c)(1),
(2) Date: Nov. 23, 2016

(87) PCT Pub. No.: WO2015/179903
PCT Pub. Date: Dec. 3, 2015

(65) Prior Publication Data
US 2017/0166777 A1   Jun. 15, 2017

Related U.S. Application Data

(60) Provisional application No. 62/005,653, filed on May 30, 2014.

(51) Int. Cl.
*C09D 183/10* (2006.01)
*B05D 5/00* (2006.01)
*C08G 18/61* (2006.01)
*C09D 175/04* (2006.01)
*C08G 77/458* (2006.01)
*C09D 5/00* (2006.01)

(52) U.S. Cl.
CPC ............ *C09D 183/10* (2013.01); *B05D 5/00* (2013.01); *C08G 18/61* (2013.01); *C08G 77/458* (2013.01); *C09D 5/00* (2013.01); *C09D 175/04* (2013.01)

(58) Field of Classification Search
None
See application file for complete search history.

(56) References Cited

U.S. PATENT DOCUMENTS

| 3,770,633 A | 11/1973 | Holley et al. |
| 5,045,599 A | 9/1991 | Murase |
| 5,187,015 A | 2/1993 | Yorkgitis et al. |
| 6,797,795 B2 * | 9/2004 | Byrd ...................... C08G 18/61 |
| | | 427/387 |
| 6,809,169 B2 * | 10/2004 | Byrd ...................... C08G 18/61 |
| | | 427/387 |
| 7,122,599 B2 | 10/2006 | Haubennestel et al. |
| 7,897,667 B2 | 3/2011 | Mabry et al. |
| 7,910,683 B2 * | 3/2011 | Byrd ........................ B05D 5/08 |
| | | 428/447 |
| 8,748,501 B2 | 6/2014 | Hwang et al. |
| 2003/0232201 A1 | 12/2003 | Byrd et al. |
| 2003/0235696 A1 | 12/2003 | Byrd |
| 2005/0033077 A1 | 2/2005 | Yamahiro et al. |
| 2006/0167206 A1 | 7/2006 | Maier et al. |
| 2008/0096027 A1 | 4/2008 | Byrd et al. |
| 2009/0263664 A1 * | 10/2009 | Byrd .................. C08G 18/3237 |
| | | 428/423.1 |
| 2014/0088219 A1 * | 3/2014 | Chen .................... C09D 5/1662 |
| | | 523/122 |
| 2014/0127516 A1 | 5/2014 | Wang et al. |
| 2015/0065674 A1 | 3/2015 | Ramirez et al. |
| 2015/0152270 A1 * | 6/2015 | Aizenberg ............ A61L 29/085 |
| | | 210/500.27 |
| 2016/0009971 A1 * | 1/2016 | Wang .................... C08G 18/246 |
| | | 428/314.4 |
| 2016/0083612 A1 | 3/2016 | Catchings, Sr. et al. |
| 2017/0218209 A1 | 8/2017 | Yuan et al. |
| 2017/0275437 A1 | 9/2017 | Diao et al. |

FOREIGN PATENT DOCUMENTS

| CN | 1345904 A | 4/2002 |
| CN | 102746782 A | 10/2012 |
| CN | 102757708 A | 10/2012 |

(Continued)

OTHER PUBLICATIONS

Zhu et al. "Ice-phobic Coatings Based on Silicon-Oil_Infused Polydimethylsiloxane" ACS Appl. Mater. Interfaces 2013, 5, 4053-4062. (Year: 2013).*
International Search Report and Written Opinion for PCT/AU2015/000324 dated Sep. 9, 2015.
Kannan et al., "Fluoro-silsesquioxane-urethane hybrid for thin film applications," ACS Applied Materials & Interfaces, vol. 1, No. 2, Feb. 25, 2009, pp. 336-347.
Extended Eureopean Search Report from related European Patent Application No. 15800372.3, dated Dec. 22, 2017.
Extended Eureopean Search Report from related European Patent Application No. 15799288.4, dated Jan. 24, 2018.
Examination Report No. 1 dated May 18, 2018 for corresponding Australian Patent Application No. 2015268086, 3 pages.
Kannan et al., "Fluoro-silsesquioxane-urethane hybrid for thin film applications," Applied Materials and Interfaces, vol. 1, No. 2, 2009, pp. 336-347.

(Continued)

Primary Examiner — Robert S Loewe
(74) Attorney, Agent, or Firm — MH2 Technology Law Group LLP

(57) ABSTRACT

The present disclosure relates to polymers which are cross-linked reaction products of a reactive siloxane and/or a polyisocyanate and/or a polyol, a polyamine and/or reactive coating capable of reducing the ability of ice to adhere to the surface of an object, in particular aircraft or other vehicles, methods of producing the polymers and their use in coating surfaces.

23 Claims, No Drawings

(56) References Cited

FOREIGN PATENT DOCUMENTS

| CN | 1003468120 A | 12/2013 |
|---|---|---|
| CN | 104053730 A | 9/2014 |
| EP | 0293084 A | 11/1988 |
| EP | 0293084 A2 | 11/1988 |
| EP | 1193303 A2 | 4/2002 |
| WO | 2013/082399 A1 | 6/2013 |
| WO | 2013082399 A1 | 6/2013 |

OTHER PUBLICATIONS

Office Action dated Jul. 10, 2018 in corresponding Chinese Application No. 201580041807.2.
First Examination Report dated Jul. 27, 2018 for related application corresponding to Australian Application No. 2015268085.
Notification of First Office Action dated Jan. 14, 2019 in corresponding Chinese Application No. 201580040554.7.

* cited by examiner

ICE ADHESION REDUCING POLYMERS

CROSS REFERENCE TO RELATED APPLICATIONS

This application is the U.S. National Phase application of International Application No. PCT/AU2015/000324, filed 29 May 2015, which claims the benefit of, and relies on the filing date of, U.S. provisional patent application No. 62/005,653, filed 30 May 2014.

FIELD

The present disclosure relates to polymers capable of mitigating the effects of ice build-up on surfaces of objects by reducing the ability of ice to adhere to the surface of an object, in particular aircraft or other vehicles, methods of producing the polymers and their use in coating surfaces.

BACKGROUND

The everyday build-up of ice upon the surfaces of objects is a familiar annoyance, and quite often a safety hazard. The layers of ice that form on highways, driveways, and walkways make transportation difficult. The masses of ice that accumulate within or upon industrial, agricultural, or other mechanical equipment make operation of the equipment difficult or impossible. The weight of ice on power lines, buildings, wind turbines, refrigeration units, air conditioning and signs often impairs those structures.

Build-up of ice upon the wings and components of an aircraft is of particular concern. The lift generated by the wings, and thus the ability of the aircraft to become and remain airborne, is dependent on the shape of the wings. Even a small accumulation of ice upon the surface of the wings can significantly increase drag and dramatically reduce lift. Further, ice build-up along control surfaces of the aircraft can impede the movement of those surfaces.

There are a large variety of techniques used to control the build-up of ice upon the wings and other surfaces of aircraft. For instance, the aircraft are deiced before takeoff by radiant heat energy or by application of a chemical spray which melts the ice from the wings. Such deicing sprays are not an environmentally preferred solution. The requirement of deicing is well known to airline passengers traveling through cold environments.

Another method of deicing aircraft on the ground or in the air includes providing flexible pneumatic coverings (bladders) along the leading edges of the wings, and supplying bursts of air or fluid to expand the flexible coverings to break away any overlying ice. Similarly, bleeding air from the aircraft engine and routing the heated air to the surface of the wing heats the wing and melts the ice. Ice may also be removed from the wing by providing mechanical energy to the wing, such as through the use of electrically actuated thumpers, which causes the wing to vibrate, fracturing any accumulated ice or by the use of electric blankets.

Although the previously mentioned methods of ice removal are generally effective, they require the continuous supply of air, chemicals, or electrical power. It would be preferred, of course, to reduce the adhesion of ice in the first place or at least, reduce the build-up of ice on surface.

One might expect that known non-stick coatings would be able to reduce ice from adhering to the surfaces which they coat. It has been found that aluminium surfaces coated with a polytetrafluoroethylene material show a reduction in adhesion (aluminium 1576 kPa, Teflon 238 kPa), but not as much as might be expected. Further, upon repeated freezing, the favourable properties exhibited by polytetrafluoroethylene and similar coatings can degrade, resulting in a coating with little or no anti-icing capacity.

There is a need for a method which provides a durable surface with low ice adhesion properties and/or delayed freezing which eliminates or at least reduces the continuous supply of air, chemicals or electrical power in order to reduce the amount of ice forming on a surface and/or the adhesion of ice to the surface.

SUMMARY

There is provided a polymer which is at least a partially cross-linked reaction product of a reactive siloxane and a polyisocyanate and/or a polyol and/or a polyamine and/or a reactive coating which is capable of reducing the adherence of ice to a surface or reducing the build-up of ice on a surface, a method of producing the polymer and a method of coating surfaces of vehicles, particularly aircraft, with the polymer. The polymer forms an ice reducing polymer coating when employed upon a surface of an object. Alternatively, the polymer may be used as a component of an existing coating to provide ice reducing properties to the coating. When coated upon a surface, it is believed that the polymer disrupts bonding between ice and the polymer coated surface. Moreover, if ice does form, it is believed that the polymer disrupts the hydrogen bonding between ice and the polymer coated surface, thereby diminishing the ability of ice to adhere to the polymer coated surface. The ability of the polymer coating to adhere to surfaces and to reduce the formation of ice upon polymer coated surfaces, makes the polymer particularly useful for reducing the adherence of ice to surfaces or reducing the build-up of ice on surfaces of objects such as power lines, buildings, wind turbines, refrigeration units and aircraft or other vehicles.

In a first aspect, there is provided an ice reducing polymer comprising a cross-linked reaction product of the following:

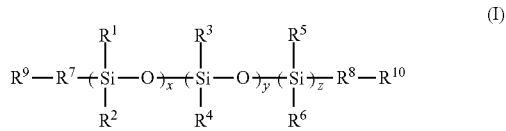

(I)

in which $R^1$ to $R^6$ are independently selected from the group consisting of H; optionally substituted $C_{1-16}$ alkyl optionally interrupted with a group selected from $NR^{11}$, C=O, C=C, S, $CO_2$, O and CH(NCO); $OSiR^{12}_3$, $(CH_2)_n OH$; $(CH_2)_n O(CH_2)_n OH$; $(CH_2)_n NR^{11}R^{12}$; $(CH_2)_n NH(CH_2)_n NR^{11}R^{12}$; $(CH_2)_n O(CH_2)_n NR^{11}R^{12}$; $(CH_2)_n NCO$; epoxy; optionally substituted $C_{1-16}$ alkylaryl; optionally substituted aryl; optionally substituted polyaryl; optionally substituted $C_{3-6}$ cycloaliphatic; and optionally substituted $C_{3-6}$ heterocyclyl;

$R^7$ and $R^8$ are independently absent or independently selected from the group consisting of optionally substituted $C_{1-16}$ alkyl optionally interrupted with a group selected from $NR^{11}$, C=O, C=C, S, $CO_2$, O and CH(NCO); O; S; $OSi(R^{13})_2$; $(CH_2)_n$; $(CH_2)_n NH$; $(CH_2)_n O$; optionally substituted $C_{1-16}$ alkylaryl; optionally substituted aryl; optionally substituted polyaryl; optionally substituted $C_{3-6}$ cycloaliphatic; and optionally substituted $C_{3-6}$ heterocyclyl;

$R^9$ and $R^{10}$ are independently selected from the group consisting of H, OH, $NR^{11}R^{12}$, optionally substituted $C_{1-16}$ alkyl, NCO, epoxy and $Si(R^{13})_3$;

$R^{11}$ and $R^{12}$ are independently selected from the group consisting of H and optionally substituted $C_{1-16}$ alkyl;

$R^{13}$ is selected from the group consisting of optionally substituted $C_{1-16}$ alkyl, $(CH_2)_nOH$ and $(CH_2)_nNH_2$;

n is 1 to 16;

x and z are independently selected from 1 to 1500; and y is 0 to 1500; and (i) a polyisocyanate and one or more of a polyol, a polyamine and a reactive coating; or (ii) any one of a polyisocyanate, a polyol, a polyamine or a reactive coating, with the provisos that:

(a) when the compound of formula (I) reacts with a polyisocyanate, then at least one of $R^1$ to $R^6$, $R^9$ and $R^{10}$ must bear at least one OH or $NH_2$ or both;

(b) when the compound of formula (I) reacts with a polyol, a polyamine or a reactive coating, then at least one of $R^1$ to $R^6$, $R^9$ and $R^{10}$ must bear at least one NCO; and (c) when the compound of formula (I) reacts with a reactive coating, then at least one of $R^1$ to $R^6$, $R^9$ and $R^{10}$ must bear at least one OH or $NH_2$ or both to react with a polyisocyanate present in the coating or at least one of $R^1$ to $R^6$, $R^9$ and $R^{10}$ must bear at least one NCO to react with a polyol or polyamine present in the coating.

The polymer is an ice reducing polymer which means that the polymer is capable of reducing the adherence of ice to a surface or reducing the build-up of ice on a surface and does not necessarily imply the total prevention of ice accretion on a surface.

In a second aspect, there is provided a polymer formulation comprising the polymer defined above, a solvent and an optional additive such as an extender, catalyst and/or cross-linking agent.

The polymer or polymer formulation may be in the form of a polymer coating or alternatively, the polymer or polymer formulation may be incorporated into an existing coating.

The polymer and the polymer coating are cross-linked. The cross-linking can be within the ice reducing polymer coating layer as well as between the polymer and an adjacent existing coating.

In a third aspect, there is provided a method of producing the polymer defined above comprising reacting the compound of formula (I) defined above with (i) a polyisocyanate and one or more of a polyol, a polyamine or a reactive coating or (ii) a polyisocyanate, a polyol, a polyamine or a reactive coating, with the provisos that:

(a) when the compound of formula (I) reacts with a polyisocyanate, then at least one of $R^1$ to $R^6$, $R^9$ and $R^{10}$ must bear at least one OH or $NH_2$ or both;

(b) when the compound of formula (I) reacts with a polyol, a polyamine or a reactive coating, then at least one of $R^1$ to $R^6$, $R^9$ and $R^{10}$ must bear at least one NCO; and (c) when the compound of formula (I) reacts with a reactive coating, then at least one of $R^1$ to $R^6$, $R^9$ and $R^{10}$ must bear at least one OH or $NH_2$ or both to react with a polyisocyanate present in the reactive coating or at least one of $R^1$ to $R^6$, $R^9$ and $R^{10}$ must bear at least one NCO to react with a polyol or polyamine present in the reactive coating.

In a fourth aspect, there is provided an object comprising an external surface in which at least a portion of the external surface is coated with the polymer or polymer formulation defined above.

In a fifth aspect, there is provided a method of imparting ice reducing properties to at least a portion of an external surface of an object comprising applying a coating of the polymer or polymer formulation defined above onto the surface.

In a sixth aspect, there is provided an object comprising components with surfaces coated with the polymer or polymer formulation defined above.

DETAILED DESCRIPTION

The disclosure relates to the polymer or polymer formulation as defined above which provides an improved polymer coating which reduces the ability of ice to adhere and/or form upon a surface. The polymer coating is particularly effective when applied to a surface of an object. For example, coated or uncoated metal, including aerospace alloys of aluminium, steel, or titanium or to coated or uncoated resin composites having glass, ceramic, or carbon fiber reinforcement and is particularly useful for reducing the formation of ice upon the control or aerodynamic lifting surfaces of aircraft or space vehicles. The coating also forms an effective ice reducer when used on a wide variety of materials other than the preferred aluminium, titanium or carbon composite, such as glass and polymeric materials.

In use, the polymer formulation could be applied to the surface, especially to an aircraft, to retain its functionality under a variety of environmental conditions, such as those typically encountered by commercial or military aircraft. A method of applying the polymer formulation to at least a portion of the surface of an object, such as an aircraft, is also provided.

The polymer may be a reaction product of the compound of formula (I), the polyisocyanate and one or more of the polyol, the polyamine and the reactive coating. In this embodiment, the compound of formula (I) and the polyisocyanate can be mixed with a solvent and sprayed on a coated or uncoated surface of an object. A polyol and/or polyamine can optionally be added as shown in Scheme 1 below.

Scheme 1

Solvent + reactive polysiloxane + polyisocyanate + polyol/polyamine (optional)

Reactive siloxane is amine and/or hydroxy functional

Alternatively, the compound of formula (I) and the polyol or polyamine can be mixed with a solvent and sprayed on a coated or uncoated surface of an object. The polyisocyanate can then be added as shown in Scheme 2 below.

Scheme 2

Solvent + reactive polysiloxane + polyol/polyamine + polyisocyanate (optional)

Reactive siloxane is isocyanate functional

The polymer may also be a reaction product of the compound of formula (I) and the polyisocyanate provided that at least one of $R^1$ to $R^6$, $R^9$ and $R^{10}$ bear at least one OH or $NH_2$ or both.

Alternatively, the polymer may be a reaction product of the compound of formula (I) and the polyol, the polyamine or coating provided that at least one of $R^1$ to $R^6$, $R^9$ and $R^{10}$ bear at least one NCO.

The compound of formula (I) may also be added to a reactive coating provided that at least one of $R^1$ to $R^6$, $R^9$ and $R^{10}$ bear at least one OH or $NH_2$ or both to react with a polyisocyanate present in the reactive coating or at least one of $R^1$ to $R^6$, $R^9$ and $R^{10}$ bear at least one NCO to react with a polyol or polyamine present in the reactive coating. In this embodiment a polyisocyanate and/or polyol or polyamine can also be added as shown in Scheme 3 below.

Scheme 3

Reactive coating + Reactive polysiloxane +
                            polyisocyanate/poyol/polyamine (optional)

Reactive coating may be an existing paint formulation such as polyurethane, polyurea or epoxy coatings Definitions The alkyls may be linear or branched, saturated or unsaturated, substituted or unsubstituted and contain 1 to 16 carbon atoms.

Examples of saturated alkyls include methyl, ethyl, propyl, isopropyl, butyl, isobutyl, sec-butyl, tert-butyl, pentyl, neopentyl, hexyl and the like.

Examples of unsaturated alkyls include alkenyls such as vinyl, 1-propenyl, 1- and 2-butenyl, 2-methyl-2-propenyl and the like or alkynyls such as ethynyl, 1-propynyl, 1- and 2-butynyl, 2-methyl-2-propynyl, 2-pentynyl, 3-pentynyl, 4-pentynyl, 2-hexynyl, 3-hexynyl, 4-hexynyl, 5-hexynyl and the like.

Unless the context requires otherwise, the term "alkyl" also encompasses alkyl groups containing one less hydrogen atom such that the group is attached via two positions i.e. divalent.

The aryls may be $C_6$, $C_{10}$, $C_{14}$ aryls selected from phenyl, naphthyl and tetrahydronapthyl.

The alkylaryls may be linear or branched, saturated or unsaturated, substituted or unsubstituted such as benzyl.

The polyaryls are two or more aryls linked by at least one carbon-carbon bond and may be selected from biphenyl and terphenyl. The polyaryls may be linear or branched, substituted or unsubstituted.

The $C_{3-6}$ cycloaliphatic is a non-aromatic cyclic group having from 3 to 6 carbon atoms and includes $C_{3-6}$ cycloalkyls such as cyclopropyl, cyclobutyl, cyclopentyl and cyclohexyl. It will be understood that cycloalkyl groups may be saturated such as cyclohexyl or unsaturated such as cyclohexenyl.

The $C_{3-6}$ heterocyclyls may be saturated or unsaturated, substituted or unsubstituted and include saturated or unsaturated 3-6 membered rings having heteroatoms selected from O, N and S.

The term "optionally substituted" refers to a group which may or may not be further substituted with 1, 2, 3, 4 or more groups, preferably 1, 2 or 3, more preferably 1 or 2 groups selected from the group consisting of $C_{1-6}$ alkyl, $C_{2-6}$ alkenyl, $C_{2-6}$ alkynyl, $C_{3-8}$ cycloalkyl, hydroxyl, oxo, $C_{1-6}$ alkoxy, aryloxy, $C_{1-6}$ alkoxyaryl, halo, $C_{1-6}$ alkylhalo (such as $CF_3$ and $CHF_2$), $C_{1-6}$ alkoxyhalo (such as $OCF_3$ and $OCHF_2$), carboxyl, esters, cyano, nitro, amino, substituted amino, di-substituted amino, acyl, ketones, amides, aminoacyl, substituted amides, di-substituted amides, thiol, alkylthio, thioxo, isocyanates, sulfates, sulfonates, sulfinyl, substituted sulfinyl, sulfonyl, substituted sulfonyl, sulfonylamides, substituted sulfonamides, di-substituted sulfonamides, aryl, $C_{1-6}$ alkyl, heterocyclyl and heteroaryl wherein each alkyl, alkenyl, alkynyl, cycloalkyl, aryl and heterocyclyl and groups containing them may be further optionally substituted. In one example, the optional substituents are selected from the group consisting of $C_{1-6}$ alkyl, hydroxyl, amino, substituted amino, di-substituted amino, isocyanate and $C_{1-6}$ alkoxy.

Formula (I)

Any reactive siloxanes of formula (I) may be used provided they are capable of reacting with a polyisocyanate and/or a polyol, a polyamine or a coating. Examples of reactive siloxanes, include amino functional siloxanes, carbinol functional siloxanes, isocyanate functional siloxanes and epoxy functional siloxanes.

The compound of formula (I) is an amino functional siloxane when the terminal group on any one of $R^1$ to $R^6$, $R^9$ and $R^{10}$ is $NH_2$, a carbinol functional siloxane when the terminal group on any one of $R^1$ to $R^6$, $R^9$ and $R^{10}$ is OH, an isocyanate functional siloxane when at least one of $R^1$ to $R^{10}$ bears at least one NCO or an epoxy functional siloxane when at least one of $R^1$ to $R^6$, $R^9$ and $R^{10}$ bears an epoxy. The integers x y and z are selected so that the molecular weight of formula (I) is in the range of 200 to 500,000, 500 to 100,000 or 500 to 50,000.

Amino functional siloxanes include, but are not limited to, those available from UCT Silanes such as PS510, PS512 and PS513 and those available from Gelest such as primary aminopropyl terminated siloxanes such as DMS-A11, DMS-A12, DMS-A15, DMS-A21, DMS-A31, DMS-A32, DMS-A35, secondary amino functional (N-ethylaminoisobutyl terminated PDMS) siloxanes such as DMS-A211, 214, aminopropylmethylsiloxane-dimethylsiloxane copolymers such as AMS-132, AMS-152, AMS-162, AMS-163, AMS-191, AMS-1203, aminoethylaminopropylmethylsiloxane-dimethylsiloxane copolymers such as AMS-233, AMS-2202, aminoethylaminoisobutylmethylsiloxane-dimethylsiloxane copolymers such as AMS-242 and ATM-1112, ATM-1322.

Carbinol functional siloxanes include, but are not limited to those available from Gelest such as carbinol (hydroxyl) terminated polydimethylsiloxanes DMS-C15, DMS-C16, DMS-C21, DMS-C23, DMS-C25, DBL-C31, DBL-C32, [bis(hydroxyethyl)amine] terminated olydimethylsiloxanes such as DMS-CA21 and (carbinol functional)methylsiloxane-dimethylsiloxane copolymers such as CMS-221, CMS-222, CMS-832, CMS-626.

Epoxy functional siloxanes include, but are not limited to, those available from Gelest such as epoxypropoxypropyl terminated polydimethylsiloxanes including DMS-E range (09-21), epoxypropoxypropyl terminated polyphenylmethylsiloxanes such as PMS E-11, PMS E15, monophenyl functional tris(epoxy terminated polydimethylsiloxane) such as MCT-EP13, mono-(2,3-epoxy)propylether terminated polydimethylsiloxane such as MCR-E11, MCR-E21 and (epoxycyclohexylethyleethylsiloxane)-dimethylsiloxane dopolymers such as ECMS-127.227.327.924.

Representative examples of aminosiloxanes include the following:

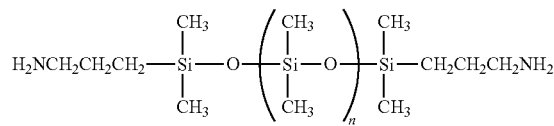

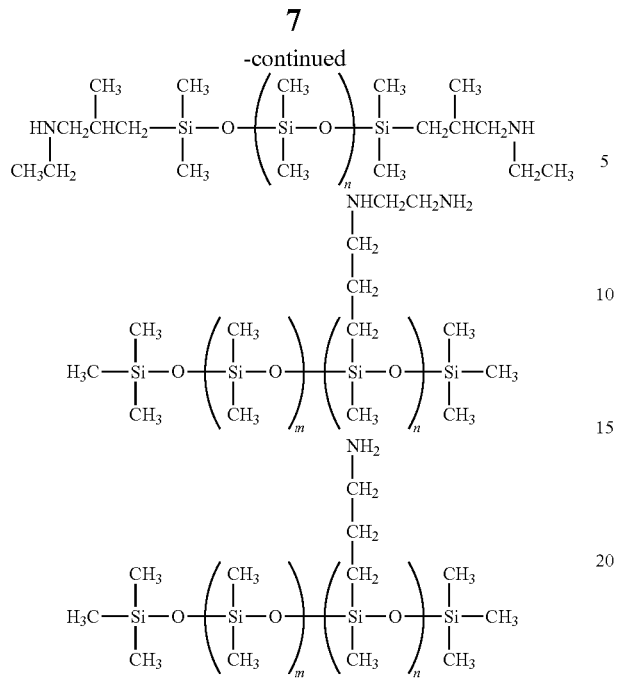
in which
m is 1-1500; and
n is 1-1500.
Representative examples of carbinol siloxanes include the following:
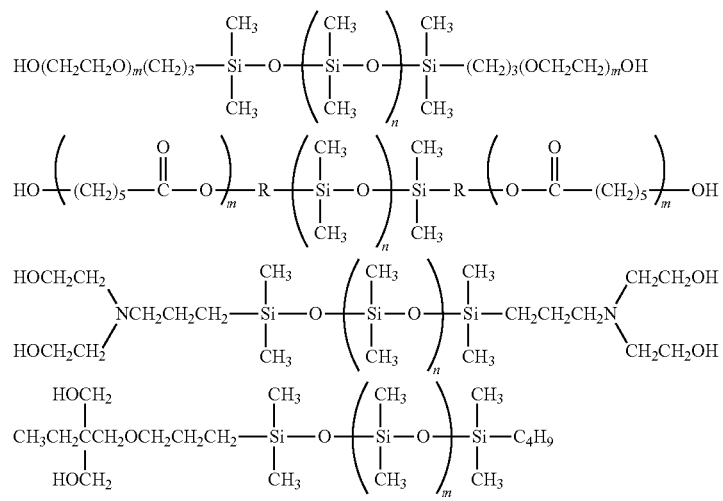
in which
m is 1-1500; and
n is 1-1500.
Representative examples of isocyanate siloxanes include the reaction product of:
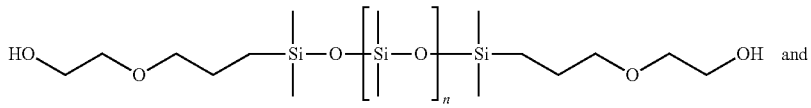 and
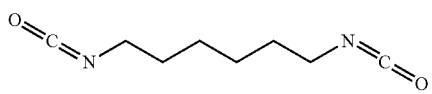

in which n is 1-1500.

The compound of formula (I) may be present in an amount of 1-99% by weight, 10-80% by weight or 20-60% by weight based on the total weight of the polymer.

Polyisocyanates

Suitable polyisocyanates include any isocyanate typically used to form cross-linked coatings. The polyisocyanate may be a masked isocyanate which are compounds in which the isocyanate group or groups are generated usually by heating at 100 to 200° C. Masked isocyanates include those supplied by Chemtura Baxendon and the Bayhydur® range from Bayer. Blocking groups used to make masked isocyanates include ε-caprolcatone, methylethylketoxime, 3,5-dimethyl-pyrazole and diethyl malonate. The polyisocyanates may include diisocyanates, triisocyanates and higher functionality isocyanates.

Diisocyanates include but are not limited to 1,5-naphthalene diisocyanate, 4,4-diphenyl-methane diisocyanate, tetra-alkyl-diphenyl methane diisocyanate, 1,3-phenylene diisocyanate, 1,4-phenylene diisocyanate, butane-1,4-diisocyanate, hexamethylene 1,6-diisocyanate, 2,2,4-trimethylhexamethylene 1,6-diisocyanate, 2,4,4-trimethyl-hexamethylene 1,6-diisocyanate, cyclohexane-1,4-diisocyanate, xylilene diisocyanate, dicyclohexyl-methane-4,4'-diisocyanate, methyl-cyclohexane diisocyanate, 1,4-tetramethylene diisocyanate, hexamethylene diisocyanate, 1,3-trimethylene diisocyanate, metaxylene diisocyanate, decamethylene 1,10-diisocyanate, cyclohexylene 1,2-diisocyanate, cyclohexylene 1,4-diisocyanate, 1-methyl cyclohexane 2,4-diisocyanate, 2,4-toluene diisocyanate, hexamethylene-1,6-diisocyanate, heptamethylene-1,7-diisocyanate, 1,3-cyclopentene diisocyanate and 1,3-cyclohexane diisocyanate.

Triisocyanates include but are not limited to trimers of isophorone diisocyanate, triisocyanato nonane, triphenyl-methane triisocyanate, 1,3,5-benzene triisocyanate, 2,4,6-toluene triisocyanate, lysine triisocyanate, an adduct of trimethylol and tetramethyl xylene diisocyanate sold under the name Cythane® 3160 by Cytec Industries, and Desmodur® N 3300, which is the isocyanurate of hexamethylene diisocyanate, available from Bayer.

Polyisocyanates with higher functionality include but are not limited to aliphatic polyisocyanates based on hexamethyldiisocyanate such as sold by Bayer under the Desmodur® N range, aliphatic polyisocyanate based on isophorondiisocyanate such as sold by Bayer under the Desmodur® Z range, aromatic polyisocyanates based on toluene diisocyanate such as sold by Bayer under the Desmodur® L range, aromatic polyisocyanates based on methylendiphenyldiisocyanate such as sold by Bayer under the Desmodur® VL and VK range, blocked polyisocyanates such as those sold under the Desmodur® BL range and Basonat® isocyanate cross-linkers (Bayer).

Isocyanurate rings containing 3 or more isocyanates groups can also be used; for example the isocyanurate ring of hexamethylene diisocyanate such as Desmodur® N-3300 and N-3390 from Bayer.

The polyisocyanate may be used in combination with other isocyanates.

In one example, the polyisocyanate is a triisocyanate such as lysine triisocyanate or polyisocyanates sold by Bayer under the Desmodur® range.

The polyisocyanate may be present in an amount of 0.1-70% by weight, 0.5-50% by weight or 1-30% by weight based on the total weight of the polymer.

Polyol or Polyamine

Suitable polyols or polyamines include those typically used to form cross-linked coatings such as polyester polyols/polyamines, polyether polyols/polyamines, polycarbonate polyols/polyamines and acrylic polyols/polyamines. A mixture of polyols/polyamines can be used in formulating the polymer.

Polyols that may be used include polyester polyols such as Desmophen®, Baycoll® (Bayer); polyether polyols such as Desmophene® and Acclaim®; polyaspartics such as Desmophen® NH; polycarbonate polyols such as Desmophen® C, as well as polymer cross-linkers such as poly(caprolactone) which contain multiple arms, as well as the polyol base component of Desothane® HS Clear Topcoat CA 8000/B900A (PPG Aerospace).

Suitable polyamines include but are not limited to primary amines and mixtures thereof including polyamines having at least two functional groups such as di-, tri- or higher functional polyamines and mixtures thereof. The polyamine may be aromatic or aliphatic, such as cycloaliphatic.

Examples of suitable aliphatic polyamines include but are not limited to ethylene diamine, 1,2-diaminopropane, 1,4-diaminobutane, 1,3-diaminopentane (Dytek® EP, Invista), 1,6-diaminohexane, 2-methyl-1,5-pentane diamine (Dytek® A, Invista), 2,5-diamino-2,5-dimethylhexane, 2,2,4- and/or 2,4,4-trimethyl-1,6-diamino-hexane,1,11-diaminoundecane, 1,12-diaminododecane,1,3- and/or 1,4-cyclohexane diamine, 1-aminotrimethyl-δ-aminomethyl-cyclohexane, 2,4- and/or 2,6-hexahydrotoluylene diamine, 2,4'-diaminodicyclohexyl methane, 4,4'-diaminodicyclohexyl methane (PACM-20, Air Products) and 3,3'-dialkyl 4,4'-diaminodicyclohexyl methanes such as 3,3'-dimethyl-4,4'-diaminodicyclohexyl methane (Dimethyl Dicykan® or Laromin® C260, BASF; Ancamine® 2049, Air Products) and 3,3'-diethyl-4,4'-diaminodicyclohexyl methane), 2,4- and/or 2,6-diaminotoluene and 2,4'- and/or 4,4'-diaminodiphenyl methane, or mixtures thereof. Other suitable amines include but are not limited to 3-(cyclohexylamine) propylamine, 3,3'-[1,4-butanediylbis]-1-propanamine and diamino functional polyetheramines having aliphatically bound primary amino groups, examples of which include Jeffamine® D-230, Jeffamine® D-400, Jeffamine® D-2000, and Jeffamine® D-4000 available from Huntsman Corporation.

In certain examples, the polyamine is a triamine. Examples of suitable triamines include dipropylene triamine, bis(hexamethylene) triamine and triamino functional polyetherpolyamines having aliphatically bound primary amino groups (Jeffamine® T-403, Jeffamine® T-3000, Jeffamine® T-5000 from Huntsman Corporation.)

In other examples, the amine can be a tetraamine or other higher functional amine.

The molecular weight of the polyol/polyamine may be in the range of 46-10000, 46-1000 or 46-100.

The polyol/polyamine may be present in an amount of 0-99% by weight, 0-50% by weight or 5-30% by weight based on the total weight of the polymer.

Reactive Coating

The reactive coating may be any coating containing a polyisocyanate and/or a polyol or polyamine. Examples include polyurethane, polyurea, polysilicone, polyester or epoxy coatings which contain a polyisocyanate and/or a polyol or polyamine. Polyol containing coatings also include coatings containing hydroxyl polyesters. Specific examples include polyurethane coatings containing polyols such as Desothane® HS Clear Topcoat CA 8000/B900A available from PPG Aerospace or Eclipse® ECL-G-2 or Eclipse® ECL-G-7 or Aerodur 3002 Clear coat from AkzoNobel Aerospace Coatings.

Surface

The surface on which the polymer coating is applied on may be an uncoated surface of an object or an object having an existing coating. The existing coating may be one or more layers of a coating selected from primers, conversion coatings, topcoats etc. The polymer coating may be applied on an object painted with a topcoat. Alternatively, the polymer may be mixed into a topcoat and applied on an object having a primer, a conversion coating or other coating. In the latter instance, the polymer forms part of the topcoat. Preferably, the existing coating or the topcoat is a polyurethane, polyurea, polysilicone, polyester or epoxy coating.

Solvents

The solvent used in the polymer formulation may be a single solvent or a combination of two or more solvents. Preferably the solvent is an organic solvent. Suitable organic solvents or solvent combinations include but are not limited to:

(a) ester based solvents such as alkyl propionate, alkoxypropionate, alkyl alkoxypropionate, alkyl acetate, alkyl alkoxyacetate, ethyl acetate, propyl acetate, isopropyl acetate, butyl acetate, isobutyl acetate, tertiary butyl acetate and glycol ether acetates;

(b) ketones such as alkyl ketones for example, methyl ethyl ketone, methyl propyl ketone, methyl amyl ketone, methyl isoamyl ketone and methyl isobutyl ketone, acetone, pentanone, butanone and 2-heptanone;

(c) aromatics such as toluene and xylene;

(d) ethers such as glycol diethers, for example, the di-$C_i$-s alkyl ethers of glycols such as diethers of ethylene glycol, diethylene glycol, triethylene glycol, tetraethylene glycol polyethylene glycol, propylene glycol, dipropylene glycol, tripropylene glycol and polypropylene glycol including but not limited to diethylene glycol dimethylether, dipropylene glycol dimethyl ether or methyl butylether of diethylene glycol such as those marketed by Dow under the trade name Downanol E-series and P-series glycolethers; and cyclic ethers such as tetrahydrofuran; and (e) halogenated solvents such as dichloromethane and tetrachloroethylene.

In view of the toxicity and negative environmental impact of halogenated solvents, it will be understood that they should be used within the constraints of environmental, health and safety regulations. Preferred solvents are ester based solvents such as alkyl propionate, alkoxypropionate, alkyl alkoxypropionate, alkyl acetate, alkyl alkoxyacetate, ethyl acetate, propyl acetate, isopropyl acetate, butyl acetate, isobutyl acetate, tertiary butyl acetate and glycol ether acetates; ketone solvents such as alkyl ketones for example, methyl ethyl ketone, methyl propyl ketone, methyl amyl ketone, methyl isoamyl ketone, methyl isobutyl ketone, acetone, pentanone, butanone and 2-heptanone.

Additives

The polymer formulation can additionally include a variety of optional additives that are somewhat dependent on the particular application of the coating such as curing agents, cross-linking agents, catalysts, fillers, pigments or other colorants, reinforcements, thixotropes, accelerators, surfactants, plasticizers, extenders, stabilizers, corrosion inhibitors, hindered amine light stabilizers, UV light absorbers and antioxidants. Preferable additives may include extenders, catalysts and cross-linking agents.

In one example, the polymer comprises or consists of the reaction product of the compound of formula (I) and (i) a reactive coating and optionally a polyisocyanate and/or a polyol or polyamine or (ii) a polyisocyanate and optionally a polyol or a polyamine or (iii) a polyol or polyamine and optionally a polyisocyanate. The polymer formulation comprises or consists of the polymer, together with a solvent, an optional extender, an optional catalyst or an optional cross-linking agent.

Examples of extenders include pot-life extenders such as 2,4-pentanedione and alkyl acetoacetate.

Examples of catalysts include metal catalysts such as dibutyltin dilaurate (DBTD), stannous octotate, lead carbonate, lead octoate, ferric acetylacetonate and alkali-metal salts.

Examples of cross-linking agents include multifunctional polymers such as star shaped or multi-armed polymers with functionality such as hydroxyl, isocyanate or amine capable of reacting with the existing coating.

The additives may be present in an amount of 0-10% by weight based on the total weight of the polymer.

Polymers

Exemplary polymers include those which are reaction products of the following combinations:

(a) Aminosiloxanes, polyisocyanate and optionally a catalyst, polyol or polyamine;

(b) Carbinolsiloxane, polyisocyanate and optionally a catalyst, polyol or polyamine;

(c) Isocyanate siloxane and a polyol or polyamine or a coating containing a polyol or polyamine; and (d) Aminosiloxane or carbinolsiloxane and a reactive coating containing polyisocyanate.

Polymer Formulation

The polymer formulation may be made by dissolving the compound of formula (I) in an organic solvent such as a ketone for example 2-heptanone (MAK) prior to reaction with a polyisocyanate and/or a polyol, a polyamine or a reactive coating. The polyisocyanate and/or polyol or polyamine may also be dissolved in ketone, ether or ester based organic solvents prior to reaction with compound of formula (I). The polymer formulation is typically mixed for 15-120 minutes prior to applying on a surface.

The polymer formulation may optionally include the additives described above, in particular extenders, catalysts and/or cross-linking agents. A catalyst such as dibutyltin dilaurate may be required for the reaction between the compound of formula (I), the polyisocyanate and/or the polyol, the polyamine or the reactive coating.

Uses

The polymer formulation may be applied as a continuous coating upon a wide variety of surfaces, particularly metal surfaces such as aluminium, stainless steel or titanium, or to composite surfaces such as resin matrices of carbon, glass fibers, or plastics and the like. The polymer formulation may also be applied to coated surfaces and as such independent of the base material of the surface.

The polymer formulation may be applied to a surface of an object in a number of ways. For instance, it may be applied to a surface by spraying the polymer formulation upon a surface. As a one component spray, a formulation of the polymer in a solvent is sprayed onto a surface to be coated. In the event a catalyst is required, the polymer formulation and solvent would be mixed with the catalyst prior to use. The resultant formulation may have a finite pot life and would have to be sprayed soon after the catalyst is mixed or during the pot life of the mixture.

As a two or more component system, the compound of formula (I) is dissolved in a solvent and the second component which is a polyisocyanate and optionally the polyol or the polyamine dissolved separately in a solvent. Alternatively a reactive coating is used in place of the second component. The two mixtures are combined in a common spray nozzle and mixed while being sprayed onto a dry surface to form a polymer coating on the surface of an object.

Once the polymer has been allowed to sufficiently cross-link and the solvent evaporates, a film of polymer is left behind.

Alternatively, the compound of formula (I) is mixed with a solution of the polyisocyanate and optionally the polyol, the polyamine or the reactive coating at a mixing nozzle of a spray gun and ejected onto the surface or mixed in a pot, transferred to a spray gun and ejected onto the surface prior to reaching the pot life of the mixture. This process results in a crosslinked polymer, which begins to cure within a few minutes and subsequently forms a cross-linked film.

Other methods of application can also be used such as those commonly known to those in the art such as by brush, roller, dip, droplet impact, printing, such as screen printing, or via a pre-packaged aerosol. The formulation may be applied as an appliqué by first depositing the formulation, as described above, upon a relief surface. When dry, the polymer coating may be removed from the relief surface and used in an appliqué process to adhere the coating onto a subsequent surface.

In a one component spray, the polymer is capable of being handled or walked upon as soon as the polymer has been allowed to sufficiently cross-link and the solvent has evaporated. Secondary process could include operations such as masking, taping and application of additional layers of the coating. Use of a heat source, such as hot air or infrared lamps, will accelerate the solvent removal and the cross-linking reaction. In the two component system, the polymer starts to crosslink and form almost as soon as the two parts are mixed and sprayed onto the surface. Again use of hot air or heat lamps will facilitate solvent removal and cross-linking to leave behind a polymer coating in the form of a film.

The coating may be in the form of a clear coating film and may be applied onto a wide variety of surfaces, including painted surfaces. A key advantage of a clear film coating is that it provides sufficient transparency to allow the coating to be used over a pigmented (coloured) topcoat for example in the formation of basecoat-clearcoat coatings known to those in the art. Alternatively, the polymer coating may be pigmented by mixture of one or more of the reaction components with a suitable pigment in a colloid mill. The clear coating or pigmented coating may then be used as a paint.

The polymer formulation can be applied anywhere between about 1° C. and about 45° C. Typically, the polymer formulation is applied at ambient temperatures between about 15° C. and 35° C. The polymer formulation may be applied to form a single layer or as multiple layers to achieve a desired thickness.

The polymer formulation may be applied as a continuous coating upon a wide variety of object surfaces, particularly metal surfaces such as aluminium, stainless steel or titanium, or to composite surfaces such as resin matrices of carbon or glass fibers, plastics and the like. The polymer may also be applied to coated surfaces and as such independent of the base material used in object. The polymer coating may be used to reduce the amount of ice forming on a surface and/or the adhesion of ice to the object's surface, for example upon the lift, stabilizing, and control surfaces of an aircraft. In this instance the entire surface of an aircraft may be coated with the polymer or just the lift, stabilizing, and/or control surfaces or other selected surfaces may be coated. Reduction of ice formation is of critical importance because even a slight build-up of ice upon the wings or other lift surfaces of the aircraft can cause dramatic alterations in the aerodynamic performance of the lift surfaces. Similarly, control surfaces of the aircraft must remain free of ice build-up which could block the movement and impair the operation of those control surfaces. Additionally, reduction of ice formation reduces the overall weight of the aircraft, thereby improving performance, and fuel efficiency. Similar advantages are provided by coating at least some portions of the outer surface of other objects such as missiles, ships, automobiles and wind turbines.

The usefulness of the polymer is not limited to metal surfaces. The polymer finds use as a coating on any of a wide variety of surfaces such as carbon composites, and even wood or asphalt, a number of which may be applications unrelated to aircraft such as wind turbines, air conditioners, refrigeration units, buildings, signs and powerlines.

Properties

When the polymer used as an ice reducing coating on a surface, the coated surface can demonstrate a minimum average adhesion force of <5N when subjected to the ice adhesion test, a pencil hardness value of up to 4H and a 60 degree glass value of up to 83.

EXAMPLES

The invention will now be described with reference to the following non-limiting examples.

The following abbreviations are used in the examples:

Amino siloxane: PS510, PS512, PS513, and DMS-A12

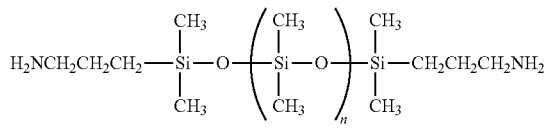

n is 5-1500

Carbinol Siloxane: DMS-C16, 15, 21, 22 and 23

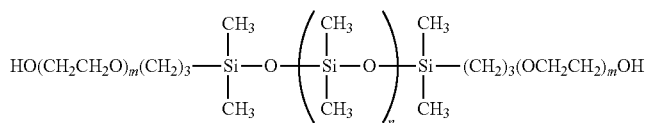

m is 1-10 and n is 5-1500

Isocyanate functional siloxane:

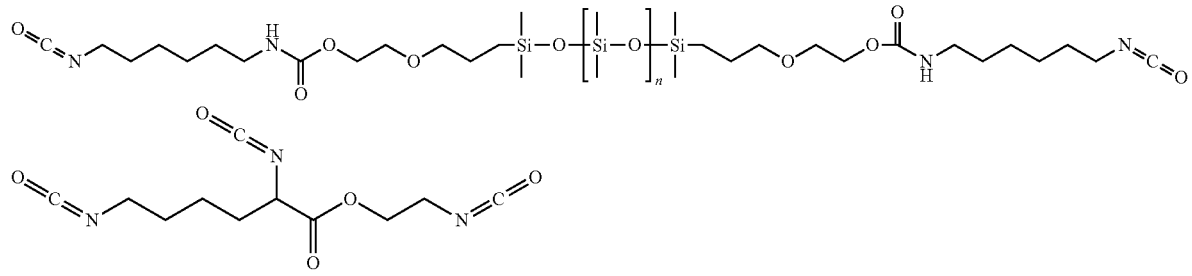

Lysine Triisocyanate

Desothane® HS CA 8000B Activator from PPG Aerospace containing polyisocyanate in solvent DESMODUR N3390 a HDI trimer in n-butylacetate available from Bayer with a NCO content of 19.6%

N75 an aliphatic polyisocyante (HDI biuret) in n-butylacetate available from Bayer with a NCO content of 16.5%

Desothane® HS CA 8000/B900A base from PPG Aerospace containing polyol, polycaprolocatone cross-linker (4-arm) solvents and stryrenic acylic polymer The details of the polymer formulations are set out in Table 1 below with reference to the following:

1. Mole ratio of 1:1 (reactive siloxane groups: isocyanate/polyol groups) used in all formulations.
2. Reaction is between a reactive siloxane and an isocyanate (except example 17 and 18 which is between isocyanate-functional siloxane and a polyol).
3. Examples 13-16 are hybrid polyurea-urethane siloxane coatings containing reactive siloxane, polyol and isocyanate.
4. All formulations were applied onto aluminium (Alclad 2024-T3) panels which had previously been coated with primer and an existing clear coat (Desothane® HS Clear Topcoat CA 8000/B900A) via a spray gun and then cured at ambient conditions for 12-24 hours.

The reactive siloxane is mixed in an organic solvent such as ketone, etheror ester. The isocyanate component is then added to the formulation (and any catalyst, polyol, or polyamine as appropriate) and the solution mixed for 20-120 minutes prior to spray or brush application of the coating on a surface.

Ice Adhesion Test Method

Ice adhesion was measured using an Instron Universal Testing Machine (model 5565) fitted with a 100 N load cell. Tests were carried out at a speed of 0.5 mm/min inside an environmental chamber maintained at −20° C. and located within the Instron. The polymer coating was applied to aluminium coupons and water (ultra-pure Milli-Q resistivity value of 18.2 MΩcm@25° C.; 55 ppb) filled cylindrical columns were frozen at −20° C. onto the coating surface. A pendulum attachment was fitted to the Instron and the ice columns and a tensile force was applied to dislodge the ice columns from the coated specimens. The tensile force required to separate the ice was recorded and the stress calculated. The mode of failure—cohesive or adhesive was also noted.

TABLE 1

| Example | Siloxane Reactive group | Siloxane Molecular weight | Isocyanate | Polyol/polyamine | Catalyst | % Siloxane (of solids content) | Solvent |
| --- | --- | --- | --- | --- | --- | --- | --- |
| Desothane HS Clear Topcoat CA 8000/B900A Clear Coat* | — | — | Desothane Activator^ | Desothane Base^^ | — | — | Proprietary mix of solvents including 2,6-dimethyl-4-heptanone, 4,6-dimethyl-2-heptanone, methyl amyl ketone, 2,4-pentanedione ethyl acetate, N-butyl acetate and 1,2,4-trimethyl benzene |
| U.S. Pat. No. 6,797,795* (Example 1) | Amino (PS510) | 5000 (2 × PS510 linked with fumaryl chloride) | 2,4-toluene diisocyanate | — | — | 100 | dichloromethane |

TABLE 1-continued

| Example | Siloxane Reactive group | Siloxane Molecular weight | Isocyanate | Polyol/ polyamine | Catalyst | % Siloxane (of solids content) | Solvent |
|---|---|---|---|---|---|---|---|
| U.S. Pat. No. 7,910,683* (Example 3) | Amino (PS510) | 5000 (2 × PS510 linked with fumaryl chloride and 4,4''-oxydianiline) | 2,4-toluene diisocyanate | — | — | 100 | dichloromethane |
| 1 | Amino (PS510, from UCT Silanes) | 2500 | Lysine triisocyanate | — | — | 100 | 2-heptanone |
| 2 | Amino (PS510: DMSA12 95: 5) | 2500 (95%) 900-100 (5%) | Lysine triisocyanate | — | — | 100 | 2-heptanone |
| 3 | Amino (PS512, UCT Silanes) | 25,000 | Lysine triisocyanate | — | — | 100 | 2-heptanone |
| 4 | Amino (PS513, UCT Silanes) | 27,000 | Lysine triisocyanate | — | — | 100 | 2-heptanone |
| 5 | Carbinol (DMS-C16, from Gelest) | 700 | Desothane Activator^ | — | 0.075 wt % DBTD$^x$ | 100 | 2-heptanone |
| 6 | Carbinol (DMS-C15) | 1000 | Desothane Activator^ | — | 0.075 wt % DBTD | 100 | 2-heptanone |
| 7 | Carbinol (DMS-C21) | 5000 | Desothane Activator^ | — | 0.075 wt % DBTD | 100 | 2-heptanone |
| 8 | Carbinol (DMS-C23) | 10,000 | Desothane Activator^ | — | 0.075 wt % DBTD | 100 | 2-heptanone |
| 9 | Amino (PS510) | 2500 | Desothane Activator^ | — | — | 100 | 2-heptanone |
| 10 | Amino (PS510) | 2500 | Desmodur N3390 (Polyisocyanate from Bayer) | — | — | 100 | 2-heptanone |
| 11 | Amino (PS510) | 2500 | Desmodur N75 (Polyisocyanate from Bayer) | — | — | 100 | 2-heptanone |
| 12 | Carbinol (DMS-C23) | 10,000 | Desmodur N3390 (Polyisocyanate from Bayer) | — | 0.075 wt % DBTD | 100 | 2-heptanone |
| 13 | Amino (PS510) | 2500 | Lysine triisocyante | Desothane Base^^ | — | 46 | 2-heptanone |
| 14 | Amino (PS510) | 2500 | Desothane Activator^ | Desothane Base^^ | — | 6.1 | 2-heptanone |
| 15 | Amino (PS510) | 2500 | Desmodur N75 | polycaprolactone (Mw 900) | | 20 | 2-heptanone |
| 16 | Amino (PS510) | 2500 | Desmodur N75 (Polyisocyanate from Bayer) | 65% polycaprolactone (Mw 900) | | 35 | 2-heptanone |
| 17 | Isocyanate (made in-house) | 1000 | — | Desothane base^^ | | 100 | 2-heptanone |
| 18 | Isocyanate (made in-house) | 5000 | — | Desothane base^^ | | 100 | 2-heptanone |
| 19 | Carbinol (DMS-C23) | 10,000 | Desothane Activator | Desothane base^^ | 0.075 wt % DBTD | 5 | 33.3% 2-heptanone 43.3% pentanone 23.3% butanone |
| 20 | Carbinol (DMS-C23) | 10,000 | Desothane Activator | Desothane base^^ | 0.075 wt % DBTD | 10 | 33.3% 2-heptanone 43.3% pentanone 23.3% butanone |

TABLE 1-continued

| Example | Siloxane Reactive group | Siloxane Molecular weight | Isocyanate | Polyol/ polyamine | Catalyst | % Siloxane (of solids content) | Solvent |
|---|---|---|---|---|---|---|---|
| 21 | Carbinol (DMS-C23) | 10,000 | Desothane Activator | Desothane base^^ | 0.075 wt % DBTD | 20 | 33.3% 2-heptanone 43.3% pentanone 23.3% butanone |
| 22 | Carbinol (DMS-C23) | 10,000 | Desothane Activator | Desothane base^^ | 0.075 wt % DBTD | 30 | 33.3% 2-heptanone 43.3% pentanone 23.3% butanone |
| 23 | Carbinol (DMS-C23) | 10,000 | Desothane Activator | Desothane base^^ | 0.075 wt % DBTD | 40 | 33.3% 2-heptanone 43.3% pentanone 23.3% butanone |
| 24 | Amino (PS510) | 2500 | Desothane Activator | — | — | 100 | 40% 2-heptanone 60% 2-pentanone |
| 25 | Carbinol (DMS-C23) | 10,000 | Desothane Activator | — | 0.0208 wt % DBTD | 100 | 33.33% 2-heptanone 43.33% 2-pentanone 23.33% 2-butanone |
| 26 | Carbinol (DMS-C15) | 1,000 | Desothane Activator | — | 0.0208 wt % DBTD | 100 | 33.33% 2-heptanone 43.33% 2-pentanone 23.33% 2-butanone |
| 27 | Carbinol (DMS-C23) | 10,000 | Desothane Activator | Desothane base^^ | 0.0156 wt % DBTD | 30 | 33.3% 2-heptanone 43.3% pentanone 23.3% butanone |

*Comparative Example
ˣDBTD—dibutyl tin dilaurate added based on resin weight
^Desothane HS Activator: Activator CA 8000B (PPG Aerospace)
^^Desothane HS Clear Topcoat CA 8000/B900A Base: Base CA 8000/B900A (PPG Aerospace)

TABLE 2

| Example | Ice Adhesion-Tensile Force (N) | Ice Adhesion-Tensile Stress (kPa) | Failure Mode** |
|---|---|---|---|
| Desothane HS CA 8000 B900A Clearcoat* | 45 ± 14.3 | 176.7 ± 56.1 | 40% CF 60% AF |
| NuSil R1082* | 11.6 ± 4.4 | 45.7 ± 17.1 | 100% AF |
| NuSil R2180* | 16.5 ± 3.1 | 64.7 ± 12.3 | 100% AF |
| U.S. Pat. No. 6,797,795* (Example 1) | 5.2 ± 2.6 | 20.3 ± 10.3 | 100% AF |
| U.S. Pat. No. 7,910,683* (Example 3) | 10.4 ± 5.9 | 40.9 ± 23.1 | 100% AF |
| 1 | 3.4 ± 1.1 | 13.4 ± 4.4 | 100% AF |
| 2 | 5.2 ± 0.3 | 20.3 ± 1.1 | 100% AF |
| 3 | 1.1 ± 0.1 | 4.4 ± 0.5 | 100% AF |
| 4 | 3.6 ± 3.1 | 14.2 ± 12.1 | 100% AF |
| 5 | 47.3 ± 15.5 | 185.8 ± 60.9 | 30% CF 70% AF |
| 6 | 36.7 ± 3.1 | 144.7 ± 12.1 | 30% CF 70% AF |
| 7 | 6.8 ± 35.6 | 26.7 ± 22.1 | 100% AF |
| 8 | 0.7 ± 0.1 | 2.6 ± 0.5 | 100% AF |
| 9 | 3.7 ± 3.1 | 14.5 ± 12.0 | 100% AF |
| 10 | 4.8 ± 2.4 | 18.9 ± 9.3 | 100% AF |
| 11 | 4.4 ± 3.5 | 17.2 ± 13.7 | 100% AF |
| 12 | 3.2 ± 3.1 | 12.8 ± 12.2 | 100% AF |
| 13 | 2.0 ± 0.5 | 7.9 ± 1.6 | 100% AF |
| 14 | 14.4 ± 4.0 | 56.6 ± 15.8 | 100% AF |
| 15 | 26.7 ± 11.4 | 104.8 ± 44.6 | 100% AF |
| 16 | 22.0 ± 9.2 | 86.5 ± 36.1 | 100% AF |
| 17 | 36.1 ± 16.4 | 142 ± 64.5 | 44% CF 56% AF |
| 18 | 24.1 ± 9.1 | 94.6 ± 35.6 | 15% CF 85% AF |
| 19 | 21.1 ± 5.6 | 82.8 ± 22 | 31% CF 69% AF |
| 20 | 14.9 ± 5.6 | 58.5 ± 21.9 | 13% CF 87% AF |
| 21 | 5.0 ± 1.3 | 19.7 ± 5.0 | 100% AF |
| 22 | 5.6 ± 2.7 | 21.9 ± 10.7 | 100% AF |
| 23 | 6.3 ± 4.6 | 24.6 ± 18.0 | 100% AF |
| 24 | 4.5 ± 3.7 | 18 ± 15 | 100% AF |
| 25 | 0.9 ± 0 | 3.3 ± 0.2 | 100% AF |

TABLE 2-continued

| Example | Ice Adhesion-Tensile Force (N) | Ice Adhesion-Tensile Stress (kPa) | Failure Mode** |
|---|---|---|---|
| 26 | 23.8 ± 3.1 | 93 ± 12 | 24% CF 76% AF |
| 27 | 9.9 ± 1.8 | 39 ± 7 | 100% AF |

*Comparative example
**AF = adhesive failure, CF = Cohesive failure

TABLE 3

| Example | $H_2O$ Contact Angle (°) | $CH_2I_2$ Contact Angle (°) | Surface Energy Dispersion (mJ/m$^2$) | Surface Energy Polar (mJ/m$^2$) | Gloss 20° | Gloss 60° | Pencil Hardness (Gauge) |
|---|---|---|---|---|---|---|---|
| Desothane HS CA 8000 B900A Clearcoat* | 82.2 | 39.8 | 41.6 | 2.5 | 86 | 95 | 4 H |
| NuSil R1082* | 109.0 | 62.2 | 28.6 | 0 | 30 | 66 | HB |
| NuSil R2180* | 110.1 | 61.5 | 29.1 | 0 | 27 | 57 | HB |
| U.S. Pat. No. 6,797,795* (Example 1) | 106.2 | 63.6 | 27.7 | 0.05 | 18 | 53 | <6 B tacky |
| U.S. Pat. No. 7,910,683* (Example 3) | 127.8 | 104.4 | 7.5 | 0.03 | 44 | 68 | <6 B tacky |
| 1 | 104.3 | 60.8 | 29.6 | 0.08 | 47 | 77 | 2 H |
| 2 | 104.9 | 61.1 | 29.3 | 0.06 | 58 | 75 | 2 H |
| 3 | 116.6 | 62.4 | 28.4 | 0.46 | 35 | 68 | 4 H |
| 4 | 116.4 | 64.3 | 27.3 | 0.35 | 51 | 72 | 2 H |
| 5 | 102.9 | 73.5 | 21.9 | 0.8 | 60 | 79 | 3 H |
| 6 | 104.6 | 72.0 | 22.8 | 0.48 | 56 | 82 | 2 H |
| 7 | 109.5 | 65.9 | 26.4 | 0 | 41 | 70 | 4 H |
| 8 | 111.4 | 64.1 | 27.4 | 0.04 | 51 | 71 | 4 H |
| 9 | 106.5 | 65.5 | 26.6 | 0.08 | 29 | 67 | 4 H |
| 10 | 104.4 | 62.7 | 28.3 | 0.12 | 56 | 76 | HB |
| 11 | 106.0 | 63.9 | 27.6 | 0.07 | 62 | 79 | 4 H |
| 12 | 106.9 | 62.4 | 28.5 | 0.02 | 58 | 80 | B |
| 13 | 104.4 | 50.7 | 27.7 | 0.15 | 58 | 78 | 4 B |
| 14 | 102.2 | 65.4 | 26.7 | 0.41 | 59 | 81 | B |
| 15 | 100.5 | 75.7 | 20.7 | 1.42 | 67 | 83 | 4 H |
| 16 | 100.5 | 67.5 | 25.4 | 0.76 | 34 | 75 | HB |
| 17 | 103 | 64.7 | 26.12 | 0.37 | 47 | 74 | 2 H |
| 18 | 103.3 | 67.5 | 27.11 | 0.27 | 51 | 75 | 4 H |
| 19 | 102.8 | 82.5 | 17 | 1.6 | 55 | 76 | 4 H |
| 20 | 104.7 | 82.4 | 17.1 | 1.02 | 55 | 73 | F |
| 21 | 108.4 | 65.7 | 26.5 | 0 | 50 | 72 | 4 H |
| 22 | 110.6 | 66.9 | 25.8 | 0 | 49 | 72 | 4 H |
| 23 | 114.9 | 63.3 | 27.9 | 0.3 | 39 | 70 | F |
| 24 | 108.8 | 64.8 | 21.7 | 0 | 49 | 71 | B |
| 25 | 111.4 | 64.6 | 27.2 | 0 | 53 | 74 | B |
| 26 | 105.2 | 73.6 | 21.9 | 0.5 | 52 | 75 | B |
| 27 | 112.5 | 66.9 | 25.8 | 0 | 40 | 70 | B |

*Comparative Example

Surface Energy Testing Method

Surface Energy calculations were based on contact angle measurements complete using 'FIRST TEN ANGSTROMS' semi-automated video equipped contact angle analyser. Diiodomethane ($CH_2I_2$) and water ($H_2O$) were employed as the reference solvents to calculate the dispersion and polar contributions to surface energy through the Young-Dupre relationship and Fowkes equation.

Gloss Test Method

Gloss was measured on a Byk-Gardner micro-TRI gloss meter at 20 and 60°.

Pencil Hardness Test Method

Pencil hardness was measured according to ASTM D3363.

Cross-linked polysiloxane based on urea and urethane cross-linked chemistry was found to be compatible with current aircraft polyurethane topcoat and can be used alone as a thin final top layer or as a component of the current topcoat to provide a coating with reduced ice adhesion. Very low ice adhesion was found on such a coating surface (Tensile Force and Tensile Stress in Table 2) and represents a significant decrease compared to a commonly used aerospace topcoat (Desothane® HS). Two commercially available NuSil polysiloxane elastomer coatings, and two coating formulations disclosed in Example 1 of U.S. Pat. No. 6,797,795 and Example 3 of U.S. Pat. No. 7,910,683 were also analysed and all have ice adhesion tensile values of greater than 19 kPa. Table 3 also demonstrates the following advantages over prior art, such as that in U.S. Pat. No. 6,797,795 and U.S. Pat. No. 6,809,169, in that there is (i) improved and proven cross-linked structure as demonstrated by pencil hardness values up to 4H (Table 2); (ii) 60 degree gloss values up to 83 (Table 3); (iii) improved compatibility to existing polyurethane topcoat for aircraft application and the coating formulation can be used as a component of the existing polyurethane topcoat; and (iv) durability including chemical resistance as demonstrated by increased hardness and the present coatings could not be redissolved in solvent (MEK) compared to the prior art coatings U.S. Pat. No. 6,797,795 and U.S. Pat. No. 6,809,169.

As shown in Table 3, use of a superhydrophobic coating (water contact angle greater than 150° and roll-off angle <10°) is not required in order to achieve very low ice adhesion values. As shown in Table 3, the present coatings have very low polar surface energy and this may in part explain the low ice adhesion. However, the NuSil polysiloxane elastomer coatings also have low polar surface energies so there are additional morphological, chemical, or physical interactions that will determine ice adhesion.

The present coatings demonstrate the following advantages:
(i) Reduced ice adhesion <19 kPa tensile stress, or <5 N tensile force, which is less than previously published values for ice adhesion;
(ii) Pencil hardness values up to 4H which are similar to current conventional hardness values for polyurethane based aerospace coatings such as Desothane and higher than commercially available siloxane coatings such as NuSil;
(iii) 60 degree gloss values up to 83, demonstrating higher gloss than commercially available siloxane coating materials such as NuSil;
(iv) Improved compatibility to existing polyurethane topcoat for aircraft application and the coating formulation can be used as a component of the existing polyurethane topcoat;
(v) Durability including chemical resistance compared with existing art such as U.S. Pat. No. 6,797,795.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various examples.

It will be understood to persons skilled in the art that many modifications may be made without departing from the spirit and scope of the invention.

The invention claimed is:
1. An ice reducing polymer having an ice adhesion tensile force of less than 5 Newtons, comprising a cross-linked reaction product of the following siloxane:

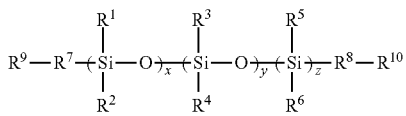

(I)

in which
$R^1$ to $R^6$ are independently selected from the group consisting of H; optionally substituted $C_{1-16}$alkyl optionally interrupted with a group selected from $NR^{11}$, C=O, C=C, S, $CO_2$, O, and CH(NCO); $OSiR^{12}_3$; $(CH_2)_nOH$; $(CH_2)_nO(CH_2)_nOH$; $(CH2)_nNR^{11}R^{12}$; $(CH2)_nNH(CH_2)_nNR^{11}R^{12}$; $(CH_2)_nO(CH_2)_nNR^{11}R^{12}$; $(CH2)_nNCO$; epoxy; optionally substituted $C_{1-16}$alkylaryl; optionally substituted aryl; optionally substituted polyaryl; optionally substituted $C_{3-6}$cycloaliphatic; and optionally substituted $C_{3-6}$heterocyclyl;
$R^7$ and $R^8$ are independently absent or independently selected from the group consisting of optionally substituted $C_{1-16}$alkyl optionally interrupted with a group selected from $NR^{11}$, C=O, C=C, S, $CO_2$, O, and CH(NCO); O; S; $OSi(R^{13})_2$; $(CH_2)_n$; $(CH_2)_nNH$; $(CH_2)_nO$; optionally substituted $C_{1-16}$alkylaryl; optionally substituted aryl; optionally substituted polyaryl; optionally substituted $C_{3-6}$cycloaliphatic; and optionally substituted $C_{3-6}$heterocyclyl;
$R^9$ and $R^{10}$ are independently selected from the group consisting of H, OH, $NR^{11}R^{12}$, optionally substituted $C_{1-16}$alkyl, NCO, epoxy and $Si(R^{13})_3$;
$R^{11}$ and $R^{12}$ are independently selected from the group consisting of H and optionally substituted $C_{1-16}$ alkyl;
$R^{13}$ is selected from the group consisting of optionally substituted $C_{1-16}$alkyl, $(CH_2)_nOH$, and $(CH_2)_nNH_2$;
n is 1 to 16;
z is 1;
x is selected from 1 to 1500; and
y is 0 to 1500; and
when at least one of $R^1$ to $R^6$, $R^9$ and $R^{10}$ bears an $NH_2$ group then the siloxane of formula (I) has a molecular weight of between about 2500 and 27000 Daltons and when at least one of $R^1$ to $R^6$, $R^9$ and $R^{10}$ bears an OH group the siloxane of formula (I) has a molecular weight of between about 5000 and 10000 Daltons; and
(i) a polyisocyanate and one or more of a polyol, a polyamine and a reactive coating, or
(ii) any one of a polyisocyanate, a polyol, a polyamine or a reactive coating;
with the provisos that:
(a) when the compound of formula (I) reacts with a polyisocyanate, then at least one of $R^1$ to $R^6$, $R^9$ and $R^{10}$ must bear at least one OH or $NH_2$ or both;
(b) when the compound of formula (I) reacts with a polyol, a polyamine or a reactive coating, then at least one of $R^1$ to $R^6$, $R^9$ and $R^{10}$ must bear at least one NCO;
(c) when the compound of formula (I) reacts with a reactive coating, then at least one of $R^1$ to $R^6$, $R^9$ and $R^{10}$ must bear at least one OH or $NH_2$ or both to react with a polyisocyanate present in the coating or at least one of $R^1$ to $R^6$, $R^9$ and $R^{10}$ must bear at least one NCO to react with a polyol or polyamine present in the coating; and
(d) when present, the amount of polyol/polyamine is in the range of from 5 to 30% by weight based on the total weight of the polymer.

2. The polymer according to claim 1 in which the compound of formula (I) is selected from the following:

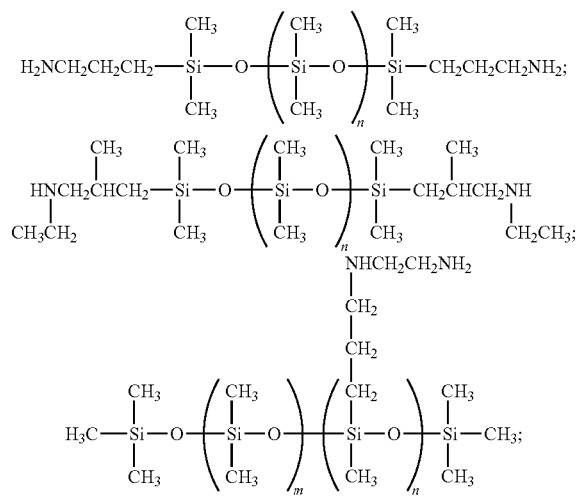

-continued

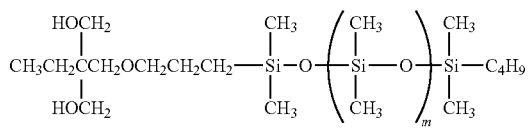

in which
m is 1-1500; and
n is 1-1500; or

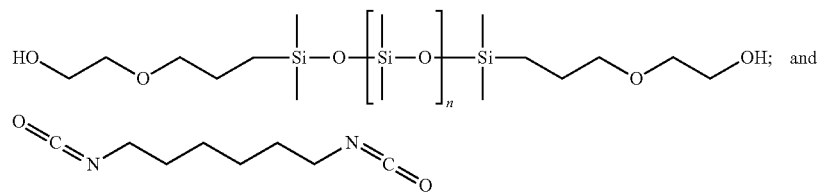

in which
m is 1-1500; and
n is 1-1500; or
the reaction product of:

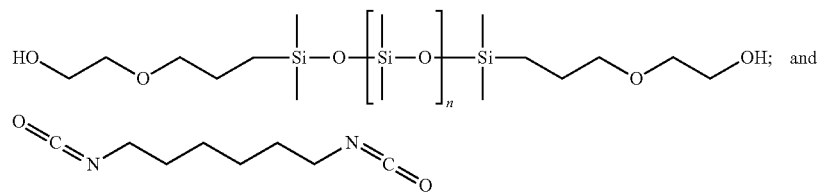

in which
n is 1-1500.

3. The polymer according to claim 1 in which the compound of formula (I) is present in an amount of 1-99% by weight based on the total weight of the polymer.

4. The polymer according to claim 1 in which the polyisocyanate is a diisocyanate, triisocyanate, or higher functionality isocyanate.

5. The polymer according to claim 4 in which the triisocyanate is lysine triisocyanate.

6. The polymer according to claim 1 in which the polyisocyanate is present in an amount of 0.1-70% by weight based on the total weight of the polymer.

7. The polymer according to claim 1 in which the polyol or polyamine is selected from a polyester polyol/polyamine, a polyether polyol/polyamine, a polycarbonate polyol/polyamine, an acrylic polyol/polyamine or a combination thereof.

8. The polymer according to claim 1 in which the molecular weight of the polyol or polyamine is in the range of 46-10000 Daltons.

9. The polymer according to claim 1 in which the polyol or polyamine is present in an amount of 0-99% by weight based on the total weight of the polymer.

10. The polymer according to claim 1 in which the reactive coating is selected from a polyurethane, polyurea, polysilicone, polyester or epoxy coating each of which contain a polyisocyanate and/or a polyol or polyamine.

11. A polymer formulation comprising the polymer according to claim 1, a solvent and an optional additive.

12. The polymer formulation according to claim 11 in which the solvent is selected from (a) an ester based solvent; (b) a ketone; (c) an aromatic; (d) an ether; (e) a halogenated solvent, or a combination thereof.

13. The polymer formulation according to claim 12, in which the solvent is a ketone.

14. The polymer formulation according to claim 13, wherein the ketone is selected from the group consisting of methyl ethyl ketone, methyl propyl ketone, methyl amyl ketone, methyl isoamyl ketone, methyl isobutyl ketone, acetone, pentanone, butanone, 2-heptanone, or combinations thereof.

15. The polymer formulation according to claim 12 in which the ester based solvent is selected from alkyl propionate, alkoxypropionate, alkyl alkoxypropionate, alkyl acetate, alkyl alkoxyacetate, ethyl acetate, propyl acetate, isopropyl acetate, butyl acetate, isobutyl acetate, tertiary butyl acetate and glycol ether acetate; or the ketone solvent is selected from methyl ethyl ketone, methyl propyl ketone, methyl amyl ketone, methyl isoamyl ketone, methyl isobutyl ketone, acetone, pentanone, butanone and 2-heptanone.

16. The polymer formulation according to claim 11 in which the optional additive is selected from a curing agent, cross-linking agent, catalyst, filler, pigment or other colorant, reinforcement, thixotrope, accelerator, surfactant, plasticizer, extender, stabilizer, corrosion inhibitor, hindered amine light stabilizer, UV light absorber, antioxidant or a combination thereof.

17. A coating comprising the polymer according to claim 1 or the polymer formulation according to claim 11.

18. An object comprising an external surface in which at least a portion of the external surface is coated with the polymer according to claim 1 or the polymer formulation according to claim 11.

19. The object according to claim 18 in which the external surface coated with the polymer has an average adhesion force of <5 N when subject to an ice adhesion test, wherein the ice adhesion test comprises, coating the polymer on the object, freezing water onto the object coated with the polymer, and measuring the tensile force required to dislodge the ice from the object coated with the polymer.

20. An object comprising components with surfaces coated with the polymer according to claim 1 or the prepolymer formulation according to claim 11.

21. A method of producing the polymer according to claim 1 comprising reacting the compound of formula (I) with (i) a polyisocyanate and one or more of a polyol, a polyamine or a reactive coating or (ii) a polyisocyanate, a polyol, a polyamine or a reactive coating,
wherein when at least one of $R^1$ to $R^6$, $R^9$ and $R^{10}$ bears an $NH_2$ group then the siloxane of formula (I) has a molecular weight of between about 2500 and 27000 Daltons and when at least one of $R^1$ to $R^6$, $R^9$ and $R^{10}$ bears an OH group the siloxane of formula (I) has a molecular weight of between about 5000 and 10000 Daltons; and with the provisos that:
(a) when the compound of formula (I) reacts with a polyisocyanate, then at least one of $R^1$ to $R^6$, $R^9$ and $R^{10}$ must bear at least one OH or $NH_2$ or both;
(b) when the compound of formula (I) reacts with a polyol, a polyamine or a reactive coating, then at least one of $R^1$ to $R^6$, $R^9$ and $R^{10}$ must bear at least one NCO; and
(c) when the compound of formula (I) reacts with a reactive coating, then at least one of $R^1$ to $R^6$, $R^9$ and $R^{10}$ must bear at least one OH or $NH_2$ or both to react with a polyisocyanate present in the reactive coating or at least one of $R^1$ to $R^6$, $R^9$ and $R^{10}$ must bear at least one NCO to react with a polyol or polyamine present in the reactive coating; and
(d) when present, the amount of polyol and polyamine is in the range of from 5 to 30% by weight based on the total weight of the polymer.

22. A method of imparting ice reducing properties to at least a portion of an external surface of an object comprising applying a coating of the polymer according to claim 1 or the polymer formulation according to claim 11 onto the surface.

23. An ice reducing polymer having an ice adhesion tensile force of less than 5 Newtons, comprising a crosslinked reaction product of the following carbinol siloxane:

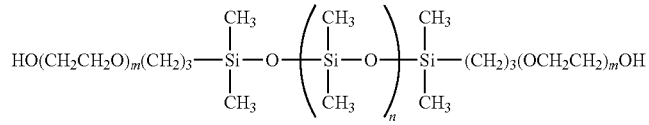

in which
m is 1-1500; and
n is 1-1500,
wherein the siloxane has a molecular weight of between about 5000 and 10000 Daltons; and
a polyisocyanate.

* * * * *

UNITED STATES PATENT AND TRADEMARK OFFICE
CERTIFICATE OF CORRECTION

PATENT NO. : 10,266,723 B2  
APPLICATION NO. : 15/313786  
DATED : April 23, 2019  
INVENTOR(S) : Douglas Henry Berry et al.

It is certified that error appears in the above-identified patent and that said Letters Patent is hereby corrected as shown below:

In the Claims

Column 23, Line 57, delete "$(CH2)_nNR^{11}R^{12}$", and insert therefor --$(CH_2)_nNR^{11}R^{12}$--.

Column 23, Line 58, delete "$(CH2)_nNH(CH2)_nNR^{11}R^{12}$; $(CH_2)_nO(CH2)_nNR^{11}R^{12}$", and insert therefor --$(CH_2)_nNH(CH_2)_nNR^{11}R^{12}$; $(CH_2)_nO(CH_2)_nNR^{11}R^{12}$--.

Column 23, Line 59, delete "$(CH2)_nNCO$", and insert therefor --$(CH_2)_nNCO$--.

Signed and Sealed this  
Twenty-ninth Day of October, 2019

Andrei Iancu  
*Director of the United States Patent and Trademark Office*